No. 840,509. PATENTED JAN. 8, 1907.
F. G. NIND & F. JULYAN.
PAPER FOLDING MACHINE.
APPLICATION FILED APR. 19, 1906.

7 SHEETS—SHEET 1.

Witnesses:
Inventors
Frederick G. Nind
Frederick Julyan

No. 840,509. PATENTED JAN. 8, 1907.
F. G. NIND & F. JULYAN.
PAPER FOLDING MACHINE.
APPLICATION FILED APR. 19, 1906.

7 SHEETS—SHEET 2.

No. 840,509. PATENTED JAN. 8, 1907.
F. G. NIND & F. JULYAN.
PAPER FOLDING MACHINE.
APPLICATION FILED APR. 19, 1906.

7 SHEETS—SHEET 6.

Witnesses:
G. V. Domarus.
A. C. Bird.

Inventors,
Frederick G. Nind
Frederick Julyan
by Bond, Adams, Pickard & Jackson
Attys

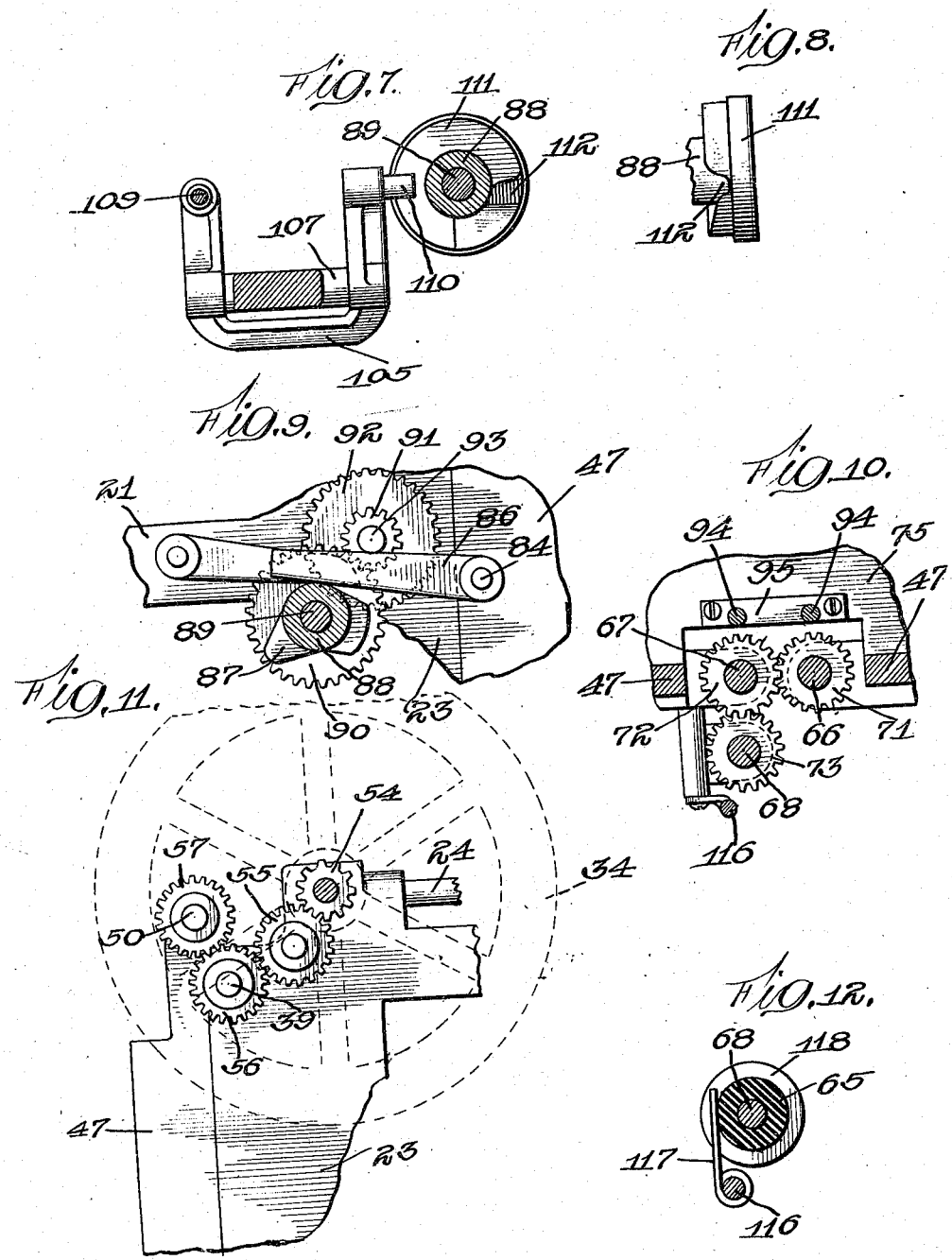

UNITED STATES PATENT OFFICE.

FREDERICK G. NIND AND FREDERICK JULYAN, OF CHICAGO, ILLINOIS, ASSIGNORS TO NIND PAPER FOLDER COMPANY, OF CHICAGO, ILLINOIS, A CORPORATION OF ILLINOIS.

PAPER-FOLDING MACHINE.

No. 840,509.  Specification of Letters Patent.  Patented Jan. 8, 1907.

Application filed April 19, 1906. Serial No. 312,666.

*To all whom it may concern:*

Be it known that we, FREDERICK G. NIND and FREDERICK JULYAN, residing at Chicago, in the county of Cook and State of Illinois, have invented certain new and useful Improvements in Paper-Folding Machines, of which the following is a specification, reference being had to the accompanying drawings.

This invention relates to paper-folding machines, and particularly to that class of machines designed to fold ordinary-sized circulars and other like sheets to adapt them for insertion in envelops.

Our invention relates more particularly to mechanism for imparting to a sheet that has already been given a transverse central fold two parallel folds at substantially equal distances from the sides of the sheet, so as to adapt such sheet when thus thrice folded to be inserted in an ordinary-sized envelop.

The object of our invention is to provide new and improved mechanism for this purpose, which we accomplish by the parts and combinations of parts hereinafter specifically described.

Those things that we believe to be new will be set forth in the claims.

Figure 1:
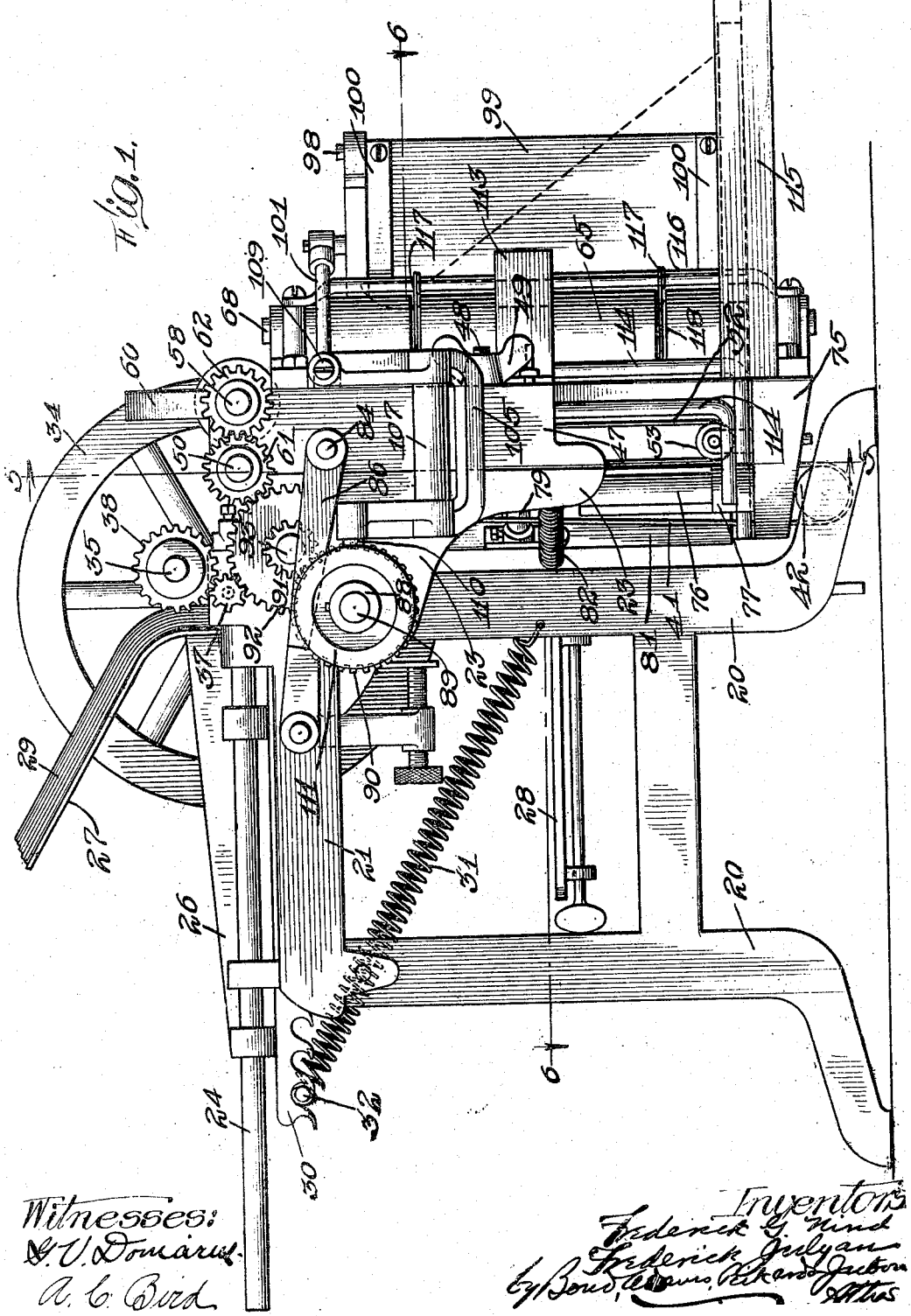
Figure 2:
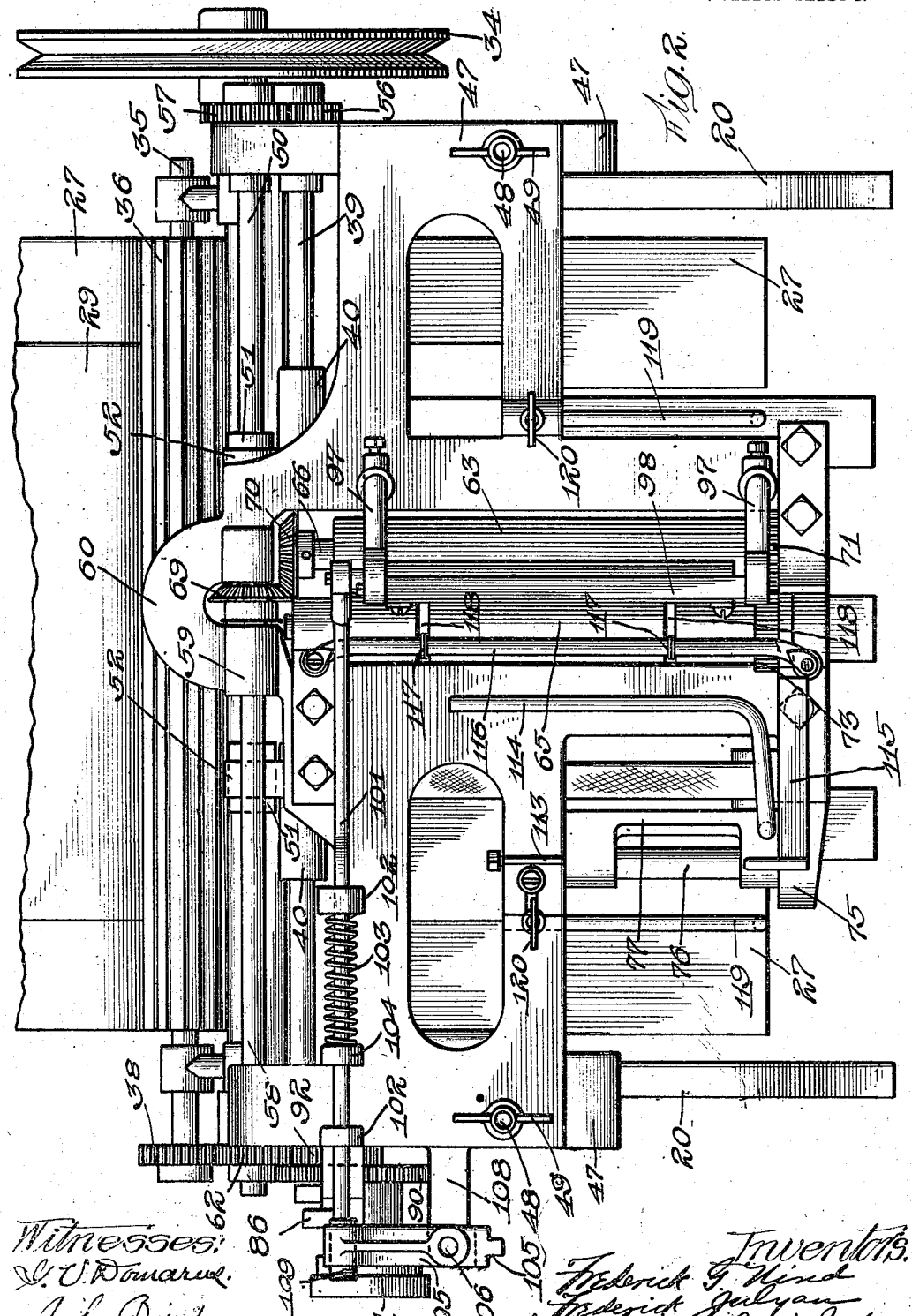
Figure 3:
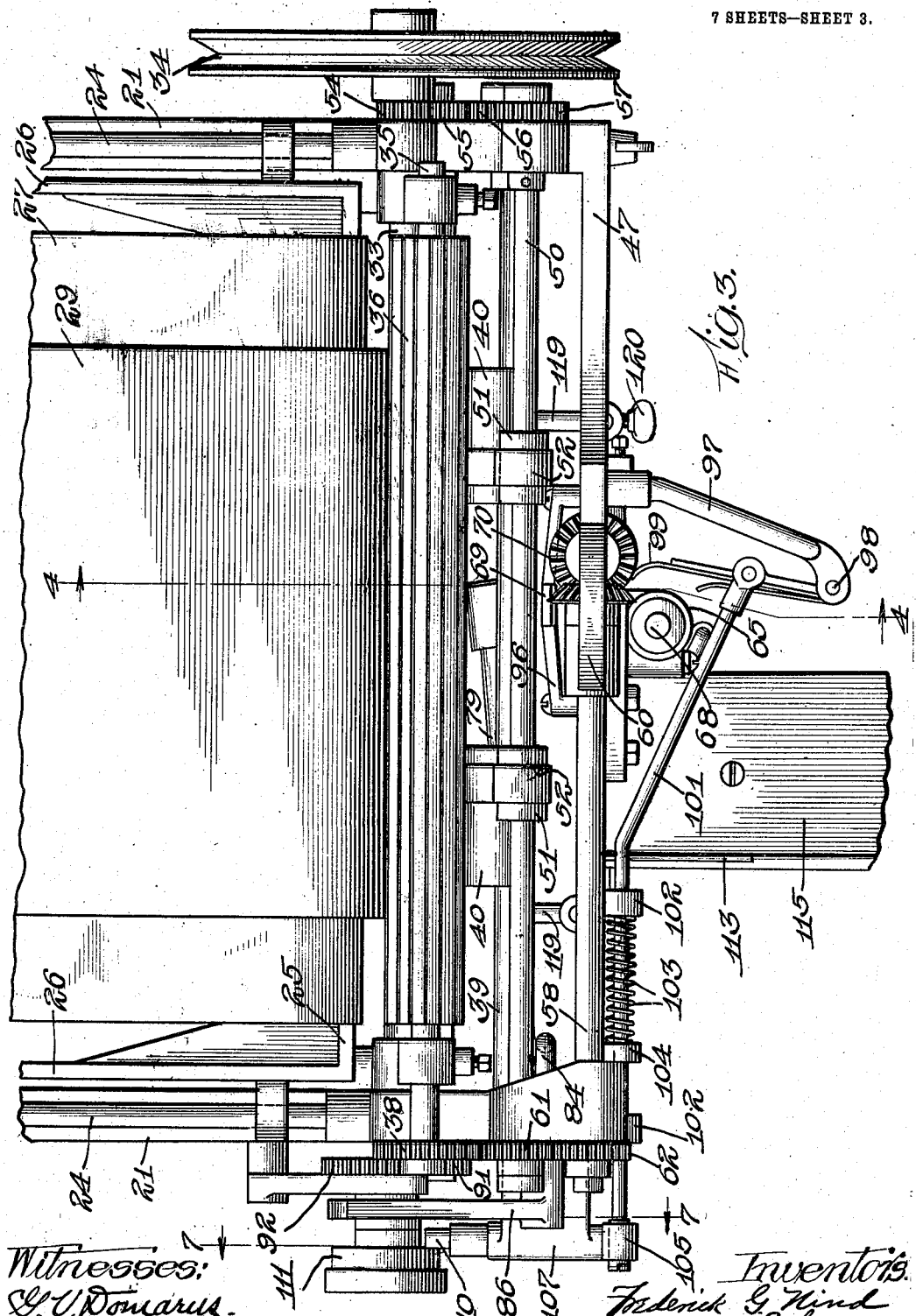
Figure 4:
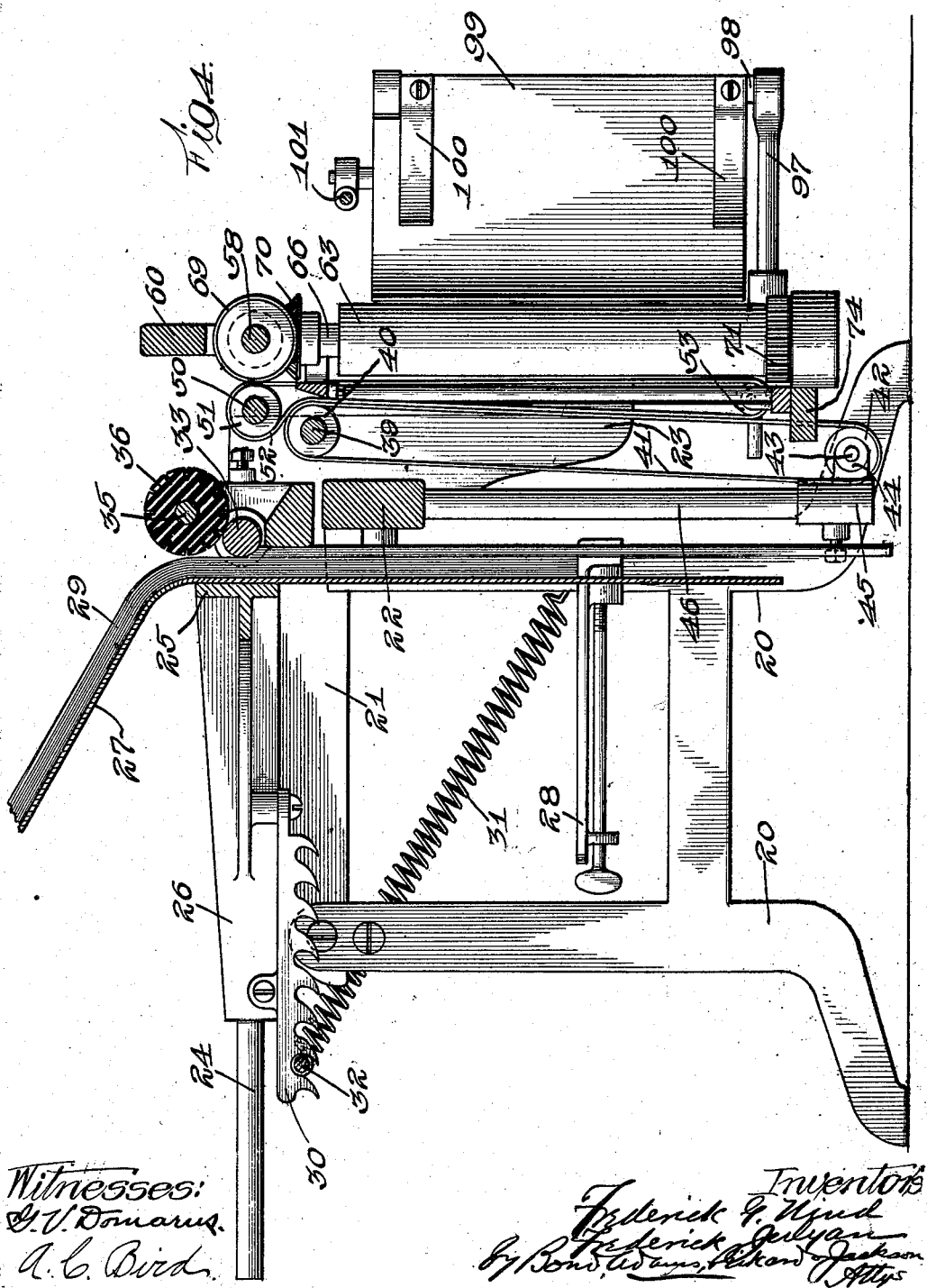
Figure 5:
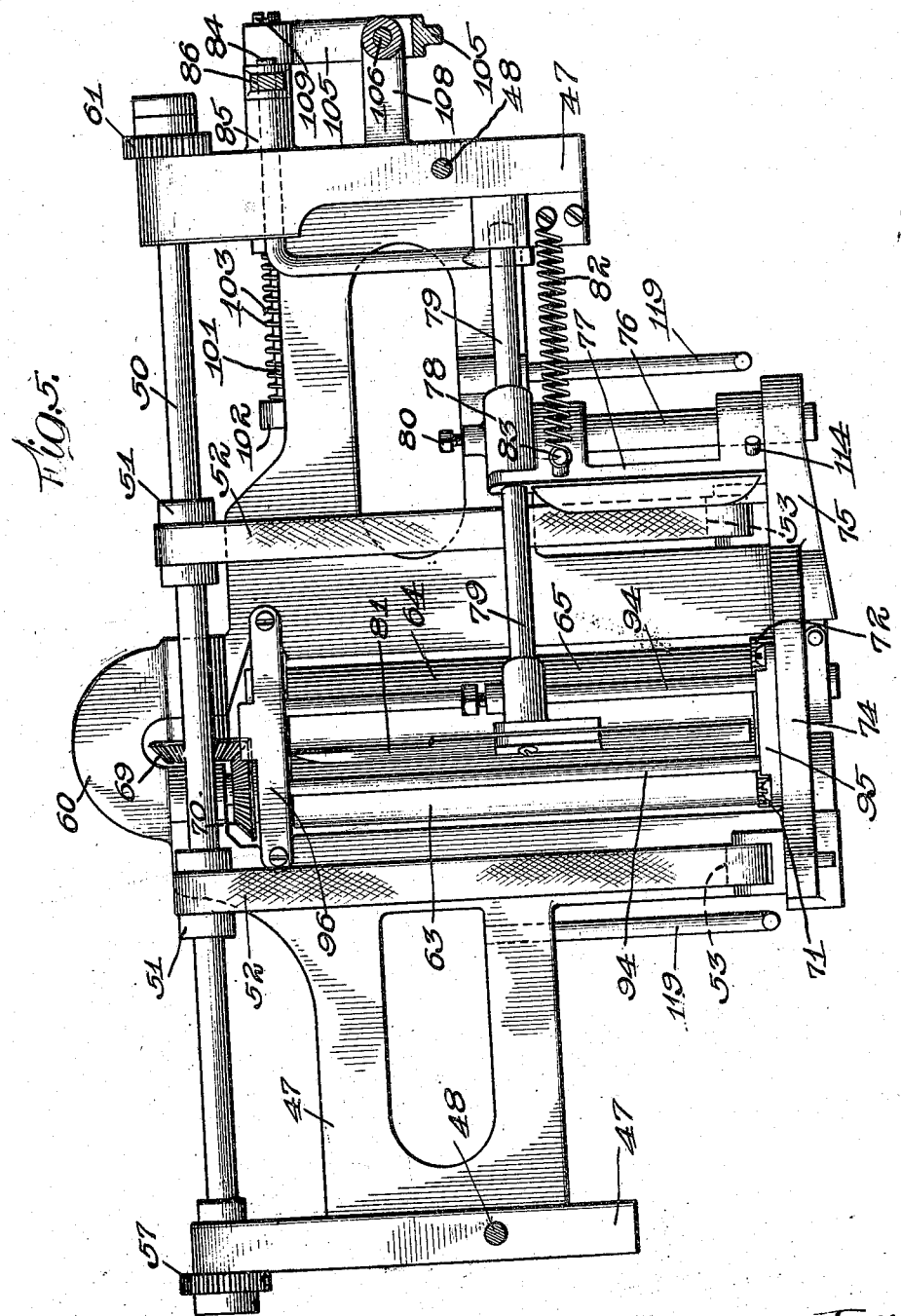
Figure 6:
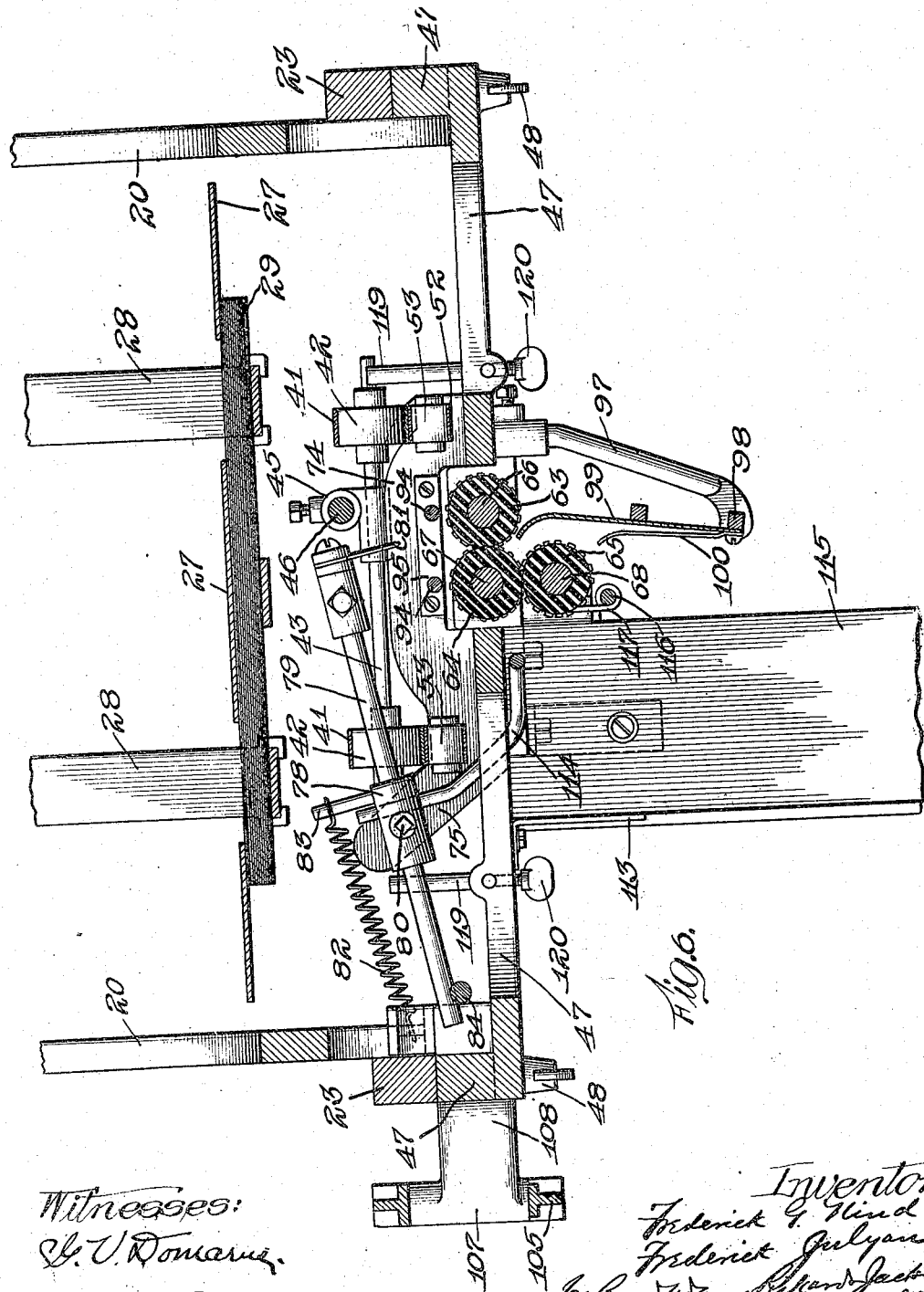

In the drawings, Figure 1 is a side elevation. Fig. 2 is a front elevation. Fig. 3 is a plan view. Fig. 4 is a vertical section at line 4 4 of Fig. 3, the driving-wheel shown in Fig. 3 being omitted. Fig. 5 is a rear view of the second folding mechanism, the view being taken substantially at line 5 5 of Fig. 1. Fig. 6 is a horizontal section taken at line 6 6 of Fig. 1. Fig. 7 is a detail of the cam and the device operated thereby for moving the plate that receives the sheet and directs it between two of the vertical rolls for imparting the final fold, the view being taken at line 7 7 of Fig. 3. Fig. 8 is a detail, being an edge view of the cam shown in Fig. 7. Fig. 9 is a detail, being a side elevation of the cam and the arm operated thereby, through which the folding-blade for directing the sheets between the first pair of vertical folding-rolls is operated. Fig. 10 is a detail showing the arrangement of the intermeshing gears secured to the shafts upon which the three vertical folding-rolls are attached, such gears being located immediately below such rolls. Fig. 11 is a detail of the driving-gears at one end of the machine. Fig. 12 is a horizontal section through the forward one of the three vertical folding-rolls and the rod extending parallel therewith and showing also on said rod one of the guard-fingers employed to insure the paper passing from between the folding-rolls in the proper manner.

Referring to the several figures of the drawings, in which corresponding parts are indicated by like reference-numerals, 20 indicates supporting-standards, a pair of such standards being provided at opposite sides of the machine, to which is suitably secured by bolting or otherwise the main frame, consisting of two longitudinally-extending side bars 21 and a cross-bar 22, (see Fig. 4,) connecting the forward ends of such side bars. We prefer to make this frame consisting of the bars 21 and 22 integral; but they of course may be formed separately and suitably united. Formed with this frame in the construction shown are two downwardly-extending brackets 23, against the vertical outer faces of which is adapted to be placed a second frame, carrying the devices that impart two parallel folds to the sheets of paper passing through the machine.

24 indicates a pair of horizontally-arranged guide-rods, each secured in any suitable manner over and to one of the side bars 21.

25 indicates a cross-head provided with two arms 26, which latter are movably mounted on the guide-rods 24 in any suitable manner.

27 indicates a follower-plate carried by the cross-head 25 and against which the pile of sheets of paper is adapted to rest, said pile of sheets being supported by one or more horizontal supports 28, that are adapted to be adjusted vertically, such adjustment being effected in any desired manner.

The pile of sheets of paper referred to is indicated by 29.

30 indicates rack-bars, each suitably secured to one of the arms 26 that carry the cross-head 25, which rack-bars in the construction shown lie below the lower edges of the arms 26 and project somewhat in rear thereof.

31 indicates coiled springs, each secured at its forward end to the forward one of the pair of uprights 20 and extending therefrom to the rear in a diagonal direction and connected to a rod 32, which rod is adapted to be placed in any one of the notches in the parallel rack-bars 30. By this means the tension of the springs can be adjusted as required by shifting said rod 32 into any one of the several notches provided, and the movable frame 25 26, with the follower-plate secured thereto, will be forced forward with the required degree of pressure.

33 indicates a roll, preferably of steel, and having a smooth polished surface. This roll is suitably journaled in the main frame of the machine a short distance above the cross-bar 22 of such main frame. Upon one of the projecting ends of this roll 33 is fixedly secured in any suitable manner a driving wheel or pulley 34.

35 indicates a shaft upon which is secured a roll 36, formed of yielding material, preferably rubber. Upon that end of the smooth roll 33 opposite to the end upon which the driving wheel or pulley is mounted is secured a pinion 37, which meshes with a gear 38, fast upon the shaft 35. Thus the turning of the roll 33 will, through the meshing of the said pinion and gear, cause the turning in the opposite direction of the roll 36, carried on the shaft 35, and sheets of paper that are successively caught between the two rolls 33 and 36 will be given their initial fold. As shown in Fig. 4, the larger roll 36 is slightly out of contact with the pile of sheets 29, and we contemplate employing suitable cam-operated mechanism to move said roll backward at intervals to engage a sheet of paper; but we do not show in detail such mechanism, as it forms no part of our present invention, and, so far as our present invention is concerned, any construction and arrangement of two folding-rolls may be employed to detach sheets of paper from the pile and impart thereto the initial fold.

39 indicates a shaft journaled in the brackets 23 near the upper forward ends of such brackets, upon which shaft are mounted spools 40, over which spools pass endless tapes 41, such tapes also passing over suitable rollers or pulleys 42, that are free to turn upon a small shaft 43, that is supported in a suitable horizontal sleeve 44, that is formed with a vertical sleeve 45, that is adjustably mounted upon a heavy rod 46, depending from the cross-bar 22 of the main frame. (See Fig. 4.)

47 indicates a heavy metal frame extending across the front of the machine and affixed to the front faces of the two large brackets 23. As it is desirable to have this frame and the folding parts carried thereby detachable from the main frame in order that the parts may be made readily accessible for purposes of repair or in order that another style of folding device may be attached to the main frame, we attach this frame 47 by means of heavy screw-threaded bolts 48, that project out from such brackets 23 and pass through suitable openings in the frame 47, to the projecting ends of which screw-threaded bolts we apply nuts 49, as shown.

50 indicates a shaft extending across the frame 47 and suitably journaled therein in the upper end of such frame. This shaft 50 is provided with spools 51, over which pass endless tapes 52, said tapes extending downward and passing over suitable pulleys or rollers 53, journaled in small brackets attached to projections on the rear face of the frame 47. The shaft 39, carried by the main frame, is rotated in the proper direction through a gear 54 on the smooth roll 33, an idler 55, and a gear 56, the gear 56 being mounted on the projecting end of the shaft 39, and the shaft 50 is rotated through the intermeshing of a gear 57, fast on its end, with the gear 56. These various gears are, as shown in Fig. 11, at that end of the machine where the power wheel or pulley 34 is located.

58 indicates a counter-shaft located just forward of the shaft 50 and journaled at one end in the upper portion of one of the ends of the frame 47 and at its other end journaled in a bearing 59, formed at one end of an arch 60, (see Fig. 2,) such arch 60 forming an integral portion of the frame 47. The shaft 50 and shorter counter-shaft 58 are caused to turn together by the intermeshing of gears 61 and 62, carried by said shaft and counter-shaft, respectively. (See Fig. 3.)

63, 64, and 65 indicate three folding-rolls, preferably of rubber, as indicated, and mounted, respectively, on vertical shafts 66, 67, and 68. (See Fig. 6.) As shown in Figs. 2 and 6, the frame 47 is provided with quite a large vertical opening near its central portion, in which the two folding-rolls 63 and 64 are located, while the roll 65 is directly in front of the roll 64. (See Fig. 6.)

69 indicates a bevel-gear carried on the inner end of the counter-shaft 58 and lying directly beneath the arch 60. This bevel-gear 69 meshes with another bevel-gear 70, secured upon the upper end of the shaft 66, which carries the folding-roll 63. The lower ends of the shafts 66, 67, and 68 are suitably supported in bearings connected with the lower portion of the frame 47. Upon the lower portion of each of these vertical shafts 66, 67, and 68 is secured a gear, such gears being indicated by 71, 72, and 73, (see Fig. 10,) the gear 72 being in mesh with each of the other named gears. The upper portion of the central space in which the rolls 63 and 64 lie is bridged, as before stated, by an arch-piece 60, and the lower portion of the frame is provided with the curved bridge-piece 74, which, as best shown in Fig. 6, curves to the rear to pass the two rolls 63 and 64. By these two pieces 60 and 74, which are best formed as integral parts of the frame, the strength of the frame is preserved, while at the same time allowing for the large vertical opening to accommodate the folding-rolls that lie therein.

75 indicates an arm at the lower end of the frame 47 and extending in the construction shown diagonally rearward, (see Fig. 6,) from which rises vertically a post 76, upon which post is pivotally mounted a yoke 77, on the upper end of which is formed a sleeve 78, through which passes a rod 79, held adjustably therein by a set-screw 80. The inner end of this rod carries a folding-blade 81, that is adapted when it is forced toward the rolls 63 and 64 to carry a sheet of paper that may be deposited between such blade and rolls, into the bite of such rolls, so that it will be caught and carried between the rolls and be thereby given a fold, as will be well understood. The blade-carrying rod 79 is normally held in the position shown in Fig. 6 by means of the coiled spring 82, that is secured at one end to a pin 83 on the yoke 77 and at the other end is secured to the frame 47.

84 indicates a rock-shaft suitably journaled in one of the side pieces of the frame 47 and in a bearing 85, extending out therefrom. The inner end of this rock-shaft 84 is turned down, (see Fig. 5,) so that its lower end lies opposite the outer end of the rod 79, that carries the blade 81.

86 indicates an arm affixed at its forward end to the rock-shaft 84 and having its rear end lying over and adapted to be contacted by a cam 87 on a sleeve 88, rotatably secured upon a stud 89, projecting out from one side of one of the pair of uprights 20. This sleeve 88 that carries the cam 87 has affixed to it a gear 90, that meshes with a pinion 91, made fast to the side of a gear 92, which gear 92 is driven from the pinion 37 on the end of the smooth roll 33, the pinion 91 and gear 92 being rotatable on a stud 93, projecting from the outer face of one of the heavy brackets 23. It will be evident that the action of the cam 87 will, through the arm 86 and rock-shaft 84, intermittently force the inner end of the arm 79 that carries the folding-blade 81 toward the folding-rolls 63 and 64.

94 indicates two vertical rods having smooth polished surfaces, such rods being located in rear of and adjacent to the folding-rolls 63 and 64 (see Figs. 5 and 6) and being journaled so as to turn, their smoothness and their being journaled insuring there being practically no friction between them and a sheet of paper as such sheet of paper is forced toward the rolls 63 and 64 by the folding-blade 81. The lower ends of these rods 94 are supported in a block 95, affixed to the bridge-piece 74, while their upper ends are journaled in a strip 96, extending across the large open space in the frame 47 near the upper end of such frame. (See Fig. 5.)

97 indicates two arms rigidly affixed to the frame 47 at one side of the large central opening therein, said arms being inclined to bring their forward ends substantially opposite the point of contact of the two folding-rolls 63 and 64 and a considerable distance in advance of such rolls.

98 indicates a bar the ends of which are journaled in the forward ends of the rigid arms 97, and to this bar is secured a plate 99, the inner end of which lies substantially opposite the point of contact of the rolls 63 and 64 and also of the rolls 64 and 65. The inner end of this plate is curved, as shown, so that when it is moved toward the bite of the rolls 64 and 65 it will act to force a sheet of paper brought in front of it between such rolls.

100 100 are light spring-fingers, between which and the face of the plate 99 a sheet of paper preparatory to receiving its final fold will pass and will be lightly held to such plate.

101 indicates a rod suitably connected to the plate 99. This rod is supported in ears 102, formed on the outer face of the frame 47, but being capable of being given a limited longitudinal movement.

103 indicates a coiled spring around the rod 101 and bearing at one end against one of the ears 102 and at its other end against a collar 104, secured upon the rod 101. The spring acts to normally hold the plate 99 drawn toward the folding-rolls 64 and 65.

105 indicates a two-armed lever or yoke which is journaled upon a pin 106, that passes through the two arms thereof near their lower ends, this pin being supported in a sleeve 107, that is formed on the end of a heavy stud 108, that projects from one end of the frame 47. (See Fig. 2.) Through the upper end of one of the arms of the yoke or double lever 105 is tapped a screw 109, the inner end of which comes in contact with the end of the rod 101. Upon the upper end of the other arm of this yoke or double-lever device is formed a projection 110, that bears against the inner face of a cam 111, that has formed in such face a deep cam-groove 112, in which the projection 110 will enter as the cam 111 rotates. The dropping of this projection into the cam-groove 112 permits the coiled spring 103 around the rod 101 to expand and of course so forces such rod as to draw the curved end of the plate 99 between the folding-rolls 64 and 65, carrying with it, of course, such piece of paper as may then be held by such plate.

By the adjustment of the screw 109 the position to which the rod 101 will be forced against the action of the spring 103 when the projection 110 is against the flat face of the cam 111 can be regulated very finely, so as to bring the plate 99 in exactly the proper position to receive sheets of paper passing between the vertical folding-rolls 63 and 64.

113 indicates a stop for the folded sheets to abut against as they issue with the final fold imparted to them from the folding-rolls 64 and 65. In the construction shown this stop consists of a small plate adjustably secured to the front face of the frame 47.

114 indicates a bent rod having its lower and inner end turned and fitted in a suitable opening in the lower portion of the yoke 77. The outer end of this bent rod lies close to the front face of the frame 47 and a short distance to one side of the folding-roll 64. It is just back of the plane of contact of the rolls 64 and 65, and hence in position to allow the folded sheets that issue from between such rolls 64 and 65 to come in front of it, and when such sheets pass completely from such last-named rolls the turning of the yoke 77 will of course also cause a turning of the rod 114, causing its forward and outer end to move forward, which movement will push the folded sheet forward on the board 115, that is suitably secured to and extends forward from the lower portion of the said frame 47. By the reverse movement of the yoke 77 the bent rod 114 will be drawn back into the position shown in Fig. 6 before another folded sheet issues from between the said folding-rolls 64 and 65.

116 indicates a rod arranged close to and substantially parallel with the folding-roll 65, which rod is rigidly supported in any suitable manner. As shown, this rod is provided with two guard-fingers 117, which in the form of construction shown are each formed of heavy wire wrapped around the rod 116, and each of said fingers projects into a groove 118, formed in the folding-roll 65, as clearly shown in Fig. 12. The fingers 117, projecting as they do at their free ends into these grooves, effectually prevent any tendency of the sheet to be carried around the roll, as will sometimes occur when the machine is being worked rapidly. We have shown these fingers as being formed of wire; but they of course might be otherwise formed, and they might, if desired, be applied to more than one of the folding-rolls.

119 indicates two supports for the sheet as it is carried down by the two sets of tapes before referred to. These supports in the construction shown are each formed of a wire having a turned-over end and are adjustable to any desired height, being set in any adjusted position by set-screws 120.

Briefly stated, the operation of the machine is as follows: By the turning of the power-wheel or pulley 34 the two rolls 33 and 36 are, by reason of the gear and pinion carried by their shafts, caused to rotate in opposite directions so that sheets of paper will be successively drawn between them from the pile of sheets placed in their rear, and a sheet thus drawn between them and given its initial fold will pass between the two sets of rotating spools 40 and 51, mounted, respectively, on the shafts 39 and 50, and will be carried by and between the tapes 41 and 52 downward until it strikes upon the turned ends of the rods 119, that constitute supports. As the paper reaches these supports the action of the cam 87 on the arm 86 will, through the rock-shaft 84, turn the arm 79, carried by the yoke 77, and force the blade 81 against the sheet of paper, causing it to buckle at that point and be directed into the bite of the folding-rolls 63 and 64, which rolls are of course being rapidly rotated through the shafts and gears hereinbefore described. The sheet of paper being drawn between these rolls has imparted to it, of course, a fold, and if the paper has been rightly placed in the machine such fold will be along a line about one-third of the distance from side to side of the paper. This fold now becomes the leading edge of the sheet, and such edge is advanced along and in contact with the plate 99, the sheet entering, as before stated, the space between the light spring-fingers 100 and the face of the plate. The mechanism is so timed that at the proper moment the projection 110 on one of the arms of the yoke or double lever 105 comes opposite the cam-groove 112 in the face of the cam 111, and the force of the coiled spring 103 around the rod 101 forces the double-lever device or yoke 105 to rock on its pivot, forcing such projection 110 into the said cam-groove 112. This action of the spring on said rod 101 of course instantly moves the plate 99, drawing the curved inner end of such plate toward the point of contact of the two folding-rolls 64 and 65 and of course forcing the sheet of paper into the bite of such last-named rolls, so that the paper will be drawn between them. This imparts the final fold to the sheet and imparts it at such position as to permit the sheet to issue from the machine in proper shape to be inserted in an ordinary-sized envelop. As before explained, when the sheet issues from between these last-named rolls the guard-fingers 117 will effectually prevent the sheet from winding around the roll 65, and the sheet, being delivered in front of the substantially vertical portion of the bent rod 114, will be promptly pushed forward on the board 115 by the forward motion at that time imparted to the rod as the yoke 77 is again turned.

By our invention we provide a very simple and compact arrangement of devices which insures sheets of paper being rapidly and accurately folded, and by providing a separate and distinct framework that carries the second folding mechanism we are enabled to readily and quickly detach from the main frame the said second frame and the folding mechanism carried thereby, so as to enable the machine as a whole to be easy of access for the purpose of repair, if required, and it is possible by this construction to enable the main frame to be equipped with other forms of folding devices, if desired, or to be used with the single set of rolls 33 and 36 for giving but a single fold to sheets of paper.

What we claim as new, and desire to secure by Letters Patent, is—

1. In a paper-folding machine, the combination with a frame and a pair of vertically-arranged folding-rolls journaled therein, of means for conducting a sheet of paper opposite said rolls, a pivoted rod, a blade on said rod adapted to press the sheet toward said rolls, a rock-shaft having a turned end adapted to bear against said rod, and means for operating said rock-shaft, substantially as specified.

2. In a paper-folding machine, the combination with a frame and a pair of vertically-arranged folding-rolls journaled therein, of means for conducting a sheet of paper opposite said rolls, a pivoted rod, means for longitudinally adjusting said rod, a blade on said rod adapted to press the sheet toward said rolls, and means for intermittently turning said rod on its pivot, substantially as specified.

3. In a paper-folding machine, the combination with a frame and a pair of folding-rolls journaled therein, of means for conducting a sheet of paper opposite said rolls, an antifriction-rod in the rear of and opposite, and parallel to each of such rolls, fixed supports for said rods, and means for forcing the sheet of paper between said rods and into the bite of said rolls, substantially as specified.

4. In a paper-folding machine, the combination with a frame and a pair of folding-rolls journaled thereon, of means for conducting a sheet of paper opposite said rolls, an antifriction-rod journaled in the rear of and opposite and parallel to each of said rolls, fixed bearings for said rods, and means for forcing the sheet of paper between said rods and into the bite of said rolls, substantially as specified.

5. In a paper-folding machine, the combination with a frame and a pair of vertical rolls journaled therein, of means for conducting a sheet of paper opposite said rolls, means for exerting a pressure on the rear face of such sheet to force it toward said rolls, a swinging plate adapted to receive such sheet as it issues from said rolls, means for intermittently swinging said plate, and means for taking the sheet from said plate and imparting to it another fold, said plate being curved at its free end to adapt it to guide the sheet to said last-named folding means, substantially as specified.

6. In a paper-folding machine, the combination with a frame and a pair of vertical rolls journaled therein, of means for conducting a sheet of paper opposite said rolls, means for exerting a pressure on the rear face of such sheet to force it toward said rolls, a third roll in front of and in contact with one of said pair of rolls, a swinging plate adapted to receive such sheet as it issues from said first-named pair of rolls and means for intermittently swinging said plate, the free end of said plate being adapted to force the sheet between said third roll and the roll in contact therewith, substantially as specified.

7. In a paper-folding machine, the combination with two vertical rolls, of a swinging plate adapted to receive a sheet of paper after the same has been folded, a rod connected with said plate, and means for intermittently moving said rod to move said plate toward said two rolls to permit the sheet of paper to be caught by the same, said plate being curved at its free end to adapt it to guide the sheet between said folding-rolls, substantially as specified.

8. In a paper-folding machine, the combination with two rolls, of a swinging plate adapted to receive a sheet of paper that is to be passed between and folded by said rolls, said plate being curved at its free end, a spring-finger on the face of the plate adapted to hold the paper lightly to the plate, and means for intermittently moving said plate toward said rolls to permit the sheet of paper to be caught thereby and withdrawn from the plate, substantially as specified.

9. In a paper-folding machine, the combination with two rolls, of a swinging plate adapted to receive a sheet of paper that is to be passed between and folded by said rolls, a spring-finger on the face of the plate adapted to hold the paper lightly to the plate, and means for intermittently moving said plate and the sheet carried thereon toward said rolls, said plate being adapted to buckle the sheet during said movement to permit the sheet of paper to be caught by the rolls and withdrawn from beneath said spring-finger, substantially as specified.

10. In a paper-folding machine, the combination with a frame, and two folding-rolls journaled therein, of a supporting device extending out from the frame and having its forward end turned to lie opposite one of said rolls, a plate pivoted to the forward end of such support, said plate being adapted to receive a sheet of paper as it issues from said rolls, means for swinging said plate on its pivot, and means for receiving the sheet from said pivoted plate and imparting an additional fold thereto, substantially as specified.

11. In a paper-folding machine, the combination with a frame, and two folding-rolls journaled therein, of two arms projecting therefrom and having their forward ends turned to lie opposite one of said rolls, a plate located between said arms and pivoted to the forward ends of such arms, said plate being adapted to receive a sheet of paper as it issues from said rolls, means for swinging said plate on its pivot, and means for receiving the sheet from said pivoted plate and imparting an additional fold thereto, substantially as specified.

12. In a paper-folding machine, the combination with two vertical rolls, of a swinging plate, an actuating-rod connected with said plate, a pivoted member bearing against the rod to hold said plate away from said rolls, a cam bearing on said pivoted member to hold it in contact with said rod and adapted to permit of the breaking of such contact at intervals, and a spring for moving such rod and plate when said contact is broken, substantially as specified.

13. In a paper-folding machine, the combination with two vertical rolls, of a swinging plate, an actuating-rod connected with said plate, a pivoted member, an adjustable contact device carried by said member arranged to normally bear against said rod, a cam adapted to actuate said pivoted member, and a spring on said rod for moving the rod and the plate connected therewith when the pressure of the said contact device on the rod is removed, substantially as specified.

14. In a paper-folding machine, the combination with two vertical rolls, of a swinging plate, an actuating-rod connected therewith, a pivoted yoke adapted to act at one end upon said rod, and a cam acting upon the other end of the yoke, substantially as specified.

15. In a paper-folding machine, the combination with three vertical folding-rolls, of means for feeding a sheet of paper in rear of two of such rolls, a blade for moving such sheet toward said last-named rolls so that it will be caught by and folded by such rolls, a pivoted support for said blade, means for directing said folded sheet between one of said two rolls and the third roll, and means connected with the pivoted blade-support for moving the sheet after passing through the last set of rolls, substantially as specified.

16. In a paper-folding machine, the combination with three vertical folding-rolls, of means for feeding a sheet of paper in rear of two of such rolls, a blade for moving such sheet toward said last-named rolls so that it will be caught by and folded by such rolls, a pivoted support for said blade, means for directing said folded sheet between one of said two rolls and the third roll, and a bent rod connected to said blade-support, said bent rod lying opposite one of said last-named folding-rolls and being adapted to move the sheet after it issues from said last-named rolls, substantially as specified.

17. In a paper-folding machine, the combination with vertical folding-rolls adapted to fold a sheet of paper, of a blade for forcing such sheet toward the rolls, a pivoted yoke to which said blade is adjustably secured, and a bent rod connected with said yoke, said rod being arranged adjacent to one of said folding-rolls and adapted to move the sheet of paper after the same is folded, substantially as specified.

FREDERICK G. NIND.
FREDERICK JULYAN.

Witnesses:
ALBERT H. ADAMS,
WILLIAM H. DE BUSK.